May 19, 1942.  E. G. BUSSE  2,283,846
BRAKE GEAR SAFETY SUPPORT
Filed Nov. 10, 1939  3 Sheets-Sheet 1

INVENTOR
EDWIN G. BUSSE
BY
Rodney Bedell
ATTORNEY

May 19, 1942.　　　　E. G. BUSSE　　　　2,283,846
BRAKE GEAR SAFETY SUPPORT
Filed Nov. 10, 1939　　　3 Sheets-Sheet 2

INVENTOR
EDWIN G. BUSSE
BY
Rodney Bedell
ATTORNEY

May 19, 1942.  E. G. BUSSE  2,283,846
BRAKE GEAR SAFETY SUPPORT
Filed Nov. 10, 1939  3 Sheets-Sheet 3

INVENTOR
EDWIN G. BUSSE
BY
Rodney Bedell
ATTORNEY

Patented May 19, 1942

2,283,846

UNITED STATES PATENT OFFICE 2,283,846

BRAKE GEAR SAFETY SUPPORT

Edwin G. Busse, Chicago, Ill., assignor to Chicago Railway Equipment Company, Chicago, Ill., a corporation of Illinois Application November 10, 1939, Serial No. 303,783

10 Claims. (Cl. 188—210)

The invention relates to railway rolling stock and more particularly to brake gear safety devices for supporting the brake gear in event of the failure of the usual supports.

It is common practice to mount the brake gear safety guards on various truck parts such as spring planks, side frames, equalizers and bolsters by securing the guards by bolts and pins extending through an element of the guard and the associated truck part.

The main object of the invention is to secure a brake gear safety guard to a truck bolster or similar truck part with a minimum of elements and particularly without requiring mounting brackets in addition to the usual bolster members.

Preferably the safety device is of spring material and is retained in place largely by its own resiliency and it is another object of the invention to avoid perforating a spring member of this type for retaining bolts or like elements.

These and other more detailed objects as will appear from the following description are attained by the structures illustrated in the accompanying drawings in which—

Figure 1:
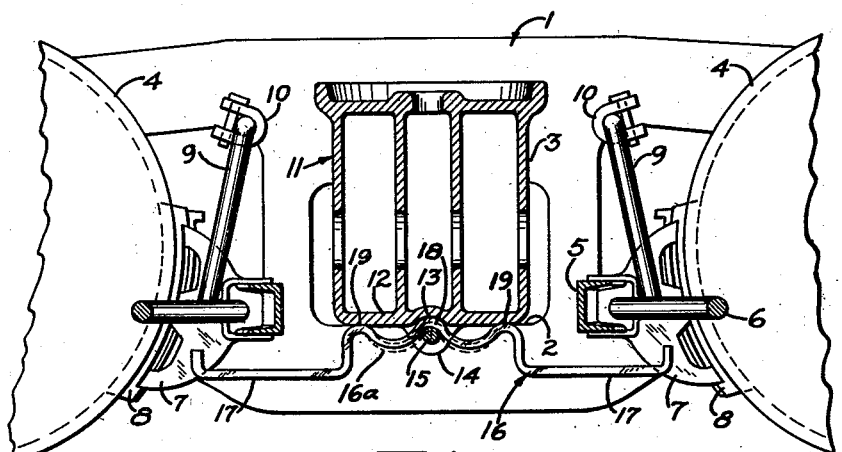
Figure 1 is a longitudinal section through a familiar type of a four-wheel truck showing a portion of the usual brake gear with a safety guard arrangement embodying the present invention.

The structure illustrated in Figure 1 includes the truck side frame 1, provided with bolster spring seats 2, and struts or bolster guides 3. The side frame is carried on axle journal boxes (not shown) mounted on the wheels 4. Each brake beam includes a channel compression member 5, tension rod 6 and brake heads 7 with shoes 8. The beam is supported by the usual hangers 9 swinging from brackets 10 on the side frames. All of the above parts are well known in the art and in themselves do not constitute the present invention.

The cast box section bolster 11 extends transversely of the truck and includes a bottom wall 12 recessed upwardly at 13, there being a pair of depending lugs 14 on wall 12 at the sides of recess 13. The brake gear safety guard 16 is a spring steel bar and includes arms 17 underlying the brake beams and a deformed center portion 18 which is seated in recess 13 between lugs 14 where it is retained by pin 15, the support bar contacting the bottom of the bolster at two points 19 spaced from recess 13. The safety guard assumes the contour indicated by the broken lines 16a when detached from the bolster. When assembled with the bolster the guard is distorted so that the center portion enters recess 13 sufficiently to accommodate the insertion of pin 15 through lugs 14.

Figure 2:
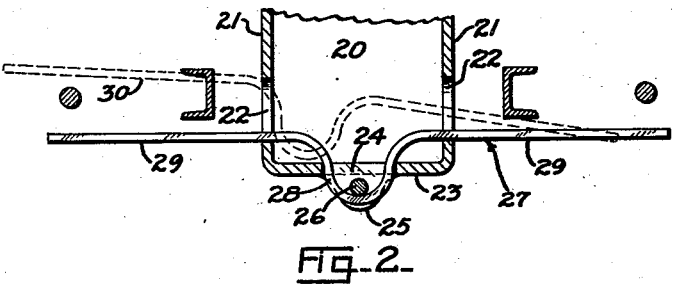
Figure 2 is a vertical transverse section through a truck bolster indicating the brake beams and safety guard and illustrating another embodiment of the invention.

In Figure 2 the bolster 20 includes side walls 21 with transverse openings 22, a bottom wall 23 having an opening 24, and a pair of depending apertured lugs 25. The brake beam safety guard 27 includes a center portion 28, within the bolster, deformed to pass downwardly through the opening 24 and under the pin 26. From the center portion 28 arms 29 extend through the openings 22 and are carried on the lower edges of the openings. The dotted line 30 indicates the guard 27 being inserted through openings 22 and the contour that the guard assumes when detached from the bolster.

To install guard 27 on the bolster, the guard is distorted so that the center portion 28 protrudes through the opening 24 sufficiently to permit pin 26 to be inserted through lugs 25 whereupon the guard will exert an upward thrust on pin 26 and a downward thrust upon the bottom edges of openings 22 to resist any force tending to displace the guard relative to the bolster.

Figure 3:
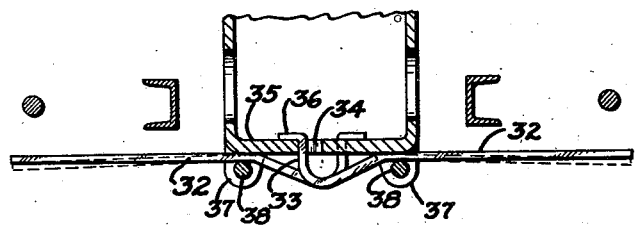
Figures 3 and 4 are similar to Figure 2 but illustrate other forms of the invention.

Figure 3 illustrates a form of the invention in which individual support arms 32 are provided for each brake beam and each arm includes a deformed inner end portion 33 passing upwardly through an opening 34 in the bolster bottom wall 35 and flanged at 36 to contact the upper side of the bolster bottom wall.

A pair of spaced depending lugs 37 at each side of the bolster bottom wall receives the corresponding arm 32 between them and when the arm is distorted upwardly a holding pin 38 may be inserted through the lugs 37 to hold the arm distorted and in assembled relation with the bolster.

Figure 4:
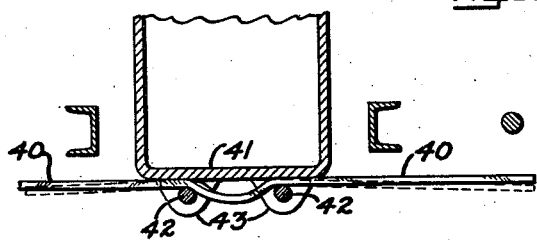

Figure 4 also illustrates the use of individual safety supports 40 for the two brake beams, but instead of the inner ends of the support arms extending through and being anchored against the upper face of the bolster bottom wall 41 they extend to the opposite side of the bolster and are anchored upon the pins 42 seated in corresponding lugs 43.

Figure 5:
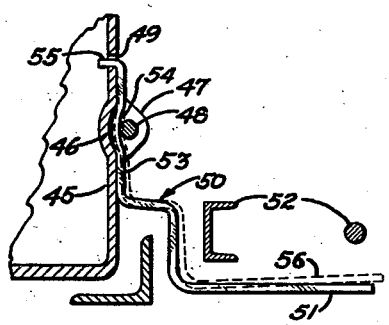
Figure 5 is a vertical transverse section through one side wall of a truck bolster with associated guard and brake beam structure and illustrating another form of the invention.

Figures 1–4 illustrate the safety guard extending beneath the bolster and retained by pins seated in lugs on the bolster bottom wall, but the invention may be embodied in structures in which the support arm is mounted upon the bolster side wall and Figure 5 illustrates such a form of the invention.

The bolster side wall 45 is recessed at 46 and is provided with projecting lugs 47 to accommodate a transverse pin 48 extending therethrough. Side wall 45 has an opening 49 above the recess 46. The safety guard 50 includes an arm portion 51 extending horizontally under the brake beam 52, a portion 53 extending vertically and adjacent to the bolster side wall 45, a distorted portion 54 received by recess 46 and an end portion 55 entering opening 49 in the bolster side wall 45. Pin 48 distorts the guard arm 50, from its normal position, as indicated by dotted line 56, to hold the guard arm against the bolster side wall under spring tension.

Figure 6:
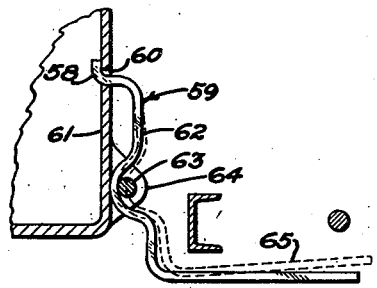
Figures 6, 7, 8, 9, 10, 11, 13 and 14 are views similar to Figure 5 but illustrate different forms of the invention.

In Figure 6 the deformed end 58 of the safety guard 59 extends through an opening 60 in the bolster side wall 61 to contact the inner surface of the wall. The vertical portion 62 of the guard arm is held in distorted position by the pin 63 passed through a pair of lugs 64 projecting from the bolster side wall 61. The position the guard arm will assume when pin 63 is removed is indicated by the dotted line 65.

Figure 7:
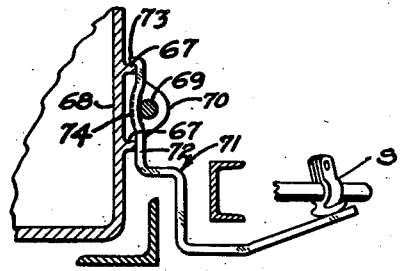

Figure 7 illustrates another form of the invention in which spaced horizontal ribs 67 project from the bolster side wall 68 and cooperate with a pin 69 passed transversely through a pair of lugs 70 projecting from the side wall to hold the safety guard 71 distorted. The guard includes a vertical portion 72 and an end flange 73 turned inwardly to bear on the top face of upper rib 67. The pin 69 distorts the portion of the safety guard 71 between ribs 67 from its normal contour as indicated by the dotted line 74.

Figure 8:
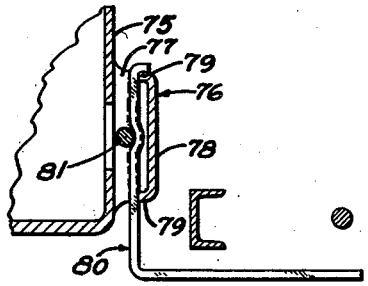

In Figure 8 the bolster side wall 75 is provided with box section bracket 76 including side walls 77 and an outer wall 78 having inwardly facing ribs 79. A vertical portion of safety guard 80 contacts the inner edges of both ribs 79 and rests on the top of the upper rib. A pin 81 passed transversely through bracket side walls 77 distorts the guard 80 from its normal contour as indicated by the dotted line.

Figure 9:
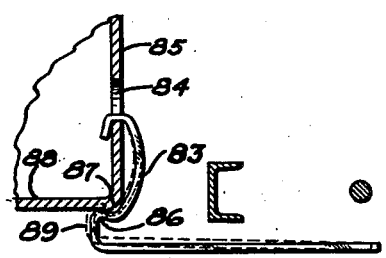

Figure 9 illustrates a form of the invention in which one end of the deformed safety guard 83 is hooked over the lower edge of opening 84 in the bolster side wall 85. By distorting the guard the portion indicated at 86 passes under and receives the lug 87 depending from the bolster bottom wall 88. The normal contour of the safety guard is indicated by the dotted line 89.

Figure 10:
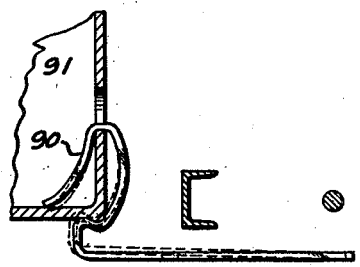

Figure 10 shows a similar arrangement, but the end of safety guard 90 entering the bolster 91 extends downwardly to contact the bolster bottom wall to aid in resisting disengagement of the guard arm from the bolster.

Figure 11:
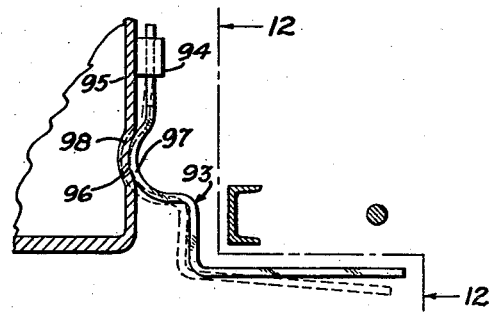
Figure 12:
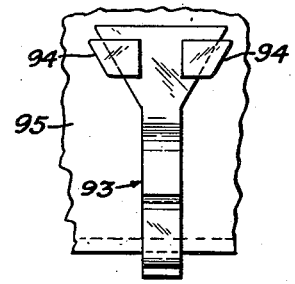
Figure 12 is a side elevation taken on line 12—12 in Figure 11.

Another form of the invention is illustrated in Figures 11 and 12 in which the wedged-shaped upper end of safety guard 93 is received in a tapered slot formed in brackets 94 which project from the bolster side wall 95. The bolster side wall is recessed at 96 to receive a deformed portion 97 of the guard. Safety guard 93 is distorted from its normal position, as indicated by the dotted line 98, and portion 97 contacts the recess on 96 in the bolster side wall under spring tension thereby resisting vertical disengagement from the bolster.

Figure 13:
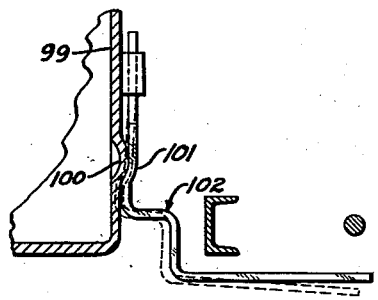

The form illustrated in Figure 13 is similar to the form shown in Figures 11 and 12 except that bolster side wall 99 is bulged outwardly at 100 to be received by the deformed portion 101 of the safety guard 102.

Figure 14:
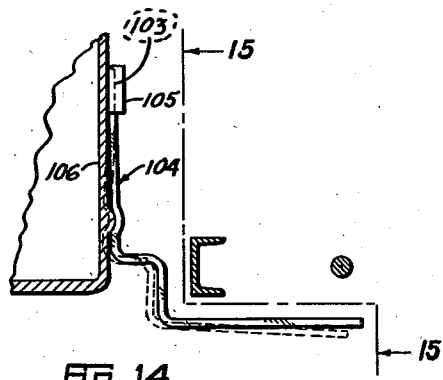
Figure 15:
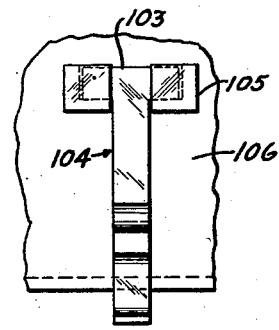
Figure 15 is a side elevation taken on line 15—15 in Figure 14.

Figures 14 and 15 illustrate a form of the invention similar to the form shown in Figure 13 except that the deformed upper end portion 103 of guard arm 104 is received in a rectangular slot in brackets 105 projecting from the bolster side wall 106.

In the forms of the invention shown in Figures 1–8, the safety bar is assembled with the bolster and then distorted by the insertion of the retaining pins to place the bar under stress tending to maintain the assembly.

In the forms of the invention shown in Figures 9–15 a permanent lug or similar element on the bolster takes the place of the pin and the support arm must be sprung in assembling it with the bolster so that its resiliency will maintain the assembly.

In all forms of the invention it is the resiliency of the support which holds the parts against rattling and disassembly.

It is understood that the forms described are illustrative and obviously various other arrangements may be adopted without departing from the spirit of the invention and the exclusive use of such modifications as come within the scope of the claims is contemplated.

Such a modification which would be obvious to those skilled in the art would be the use of more than one support under each brake beam as where it was desired to use fourth point supports near the ends of the bolster instead of a single support near the middle of the bolster.

The term "support," as used in the claims, includes devices of the type described, whether functioning normally as an actual support for the brake gear or as a guard normally out of contact with the beam but positioned relative thereto to prevent the beam from dropping to the rail in the event of failure of a hanger, or functioning mainly as a guide for maintaining the angularity of the beam in its movement to and from the wheel as indicated in Figure 7 where the outer end of the support is bent upwardly to engage the shoe S on the beam tension rod.

Reference is here made to a later application filed October 13, 1941, Serial No. 414,723, directed to matter divided out of the present application and to associated matter disclosed in the later application.

What is claimed is:

1. In combination with a railway truck bolster having an upright wall and integral bracket structure projecting laterally therefrom, and having elements spaced apart vertically and facing toward said wall, a brake beam support inserted through said bracket structure and having a part resting thereon, and a pin extending through the sides of said bracket structure to distort said support between said elements and maintain the assembly of said support and bolster.

2. In combination with a railway truck bolster having a vertical wall and bracket structure thereon comprising spaced sides extending laterally from the wall and elements on the outer portions of said sides facing towards said wall, a brake gear support of spring material carried and held in assembled relation with said wall by said bracket structure and deformed by the latter and a part of said wall spaced from said bracket structure to avoid play between the bolster and the wall.

3. In combination with a railway truck bolster having a vertical wall and lugs projecting from said wall spaced apart lengthwise of the bolster and forming upwardly opening pockets, a brake gear support having an upright arm with an enlarged upper end seated in said pockets and a distorted lower portion seated against the bolster wall, and a laterally extending portion for underlying a part of the brake gear.

4. In combination with a railway truck bolster having a wall provided with a recess, a brake gear support device including an arm of resilient material having a portion supported in said recess and having elements holding said portion against movement transversely of said recess, said arm being held distorted by said elements and by contact with the bolster of a part of said arm spaced from said elements to maintain the assembly of the device and bolster.

5. In combination, a railway truck bolster having a wall provided with an upwardly facing element, and a brake gear support device including an arm of resilient material with a part having engagement with said element to afford a positive support for the arm and with a portion spaced from said part and thrust against said wall by the distortion of said arm by said engagement to maintain the assembly of the bolster and support device.

6. In combination with a railway truck bolster including a side wall having integral projections forming a bracket with an upwardly opening pocket, a brake beam support having a part inserted in said pocket and engaging an upwardly facing edge thereof to carry said support, the bracket and support part being arranged to hold a portion of said support spaced from said pocket against a bolster part to maintain their assembly.

7. In combination with a railway truck bolster including a side wall having integral projections forming an upwardly opening pocket, a brake beam support including an arm extending alongside of said bolster wall and having an end portion seated in said pocket and engaging an upwardly facing edge thereof to carry said support, there being a downwardly facing element on said bolster spaced below said pocket and engaging a correspondingly upwardly facing portion of said arm to hold said arm and bolster assembled.

8. A combination as described in claim 7 in which the support arm is of spring material and the engagement of the arm and bolster element is maintained by the resiliency of the arm.

9. In combination, a railway truck bolster having an upright wall, members thereon projecting laterally from said wall and spaced from each other longitudinally of the bolster, there being elements on the projecting portions of said members extending longitudinally of said wall and facing said wall, said wall, members and elements forming an upwardly and downwardly opening pocket, a brake gear support device having an arm of resilient material received in said pocket in close proximity to said wall but spaced slightly therefrom and with the portion engaging said elements held by said elements against movement away from said wall, and means on said bolster and spaced from said elements but cooperating therewith to distort the adjacent portion of said arm away from said wall to maintain assembly of said bolster and device.

10. In combination with a railway truck bolster having an upright wall and integral bracket structure projecting laterally therefrom, and having elements spaced apart vertically and facing toward said wall, a brake beam support of spring material including an upright arm inserted through said bracket structure and with one face bearing against said elements and having an offset part at its upper end overlying the upper of said elements, and a removable pin extending through the sides of said bracket structure and engaging the opposite face of said arm to distort the same between said elements and maintain the assembly of said support and bolster.

EDWIN G. BUSSE.